(12) United States Patent
Dahlbacka et al.

(10) Patent No.: US 8,052,213 B2
(45) Date of Patent: Nov. 8, 2011

(54) SEAT WITH ADJUSTABLE SEAT OCCUPANT SUPPORT ASSEMBLY AND INTEGRALLY FORMED SEAT SHELL THEREFOR

(75) Inventors: Bruce Dahlbacka, Port Washington, WI (US); Kenneth Braun, Mequon, WI (US); Kevin Hill, Mequon, WI (US)

(73) Assignee: Milsco Manufacturing Company, a unit of Jason Incorporated, Milwaukee, WI (US)

( * ) Notice: Subject to any disclaimer, the term of this patent is extended or adjusted under 35 U.S.C. 154(b) by 381 days.

(21) Appl. No.: 11/773,391

(22) Filed: Jul. 3, 2007

(65) Prior Publication Data
US 2008/0007102 A1  Jan. 10, 2008

Related U.S. Application Data

(60) Provisional application No. 60/806,501, filed on Jul. 3, 2006.

(51) Int. Cl.
*A47C 7/46* (2006.01)
*A47C 7/02* (2006.01)
*A47C 3/12* (2006.01)

(52) U.S. Cl. ................................. 297/284.4; 297/452.65
(58) Field of Classification Search ............... 297/284.4, 297/284.11, 452.65, 248.3, 452.41
See application file for complete search history.

(56) References Cited

U.S. PATENT DOCUMENTS

| | | | |
|---|---|---|---|
| 4,152,023 A | 5/1979 | Buhk | |
| 4,155,593 A | 5/1979 | Swenson et al. | |
| 4,156,544 A * | 5/1979 | Swenson et al. | 297/284.4 |
| 4,181,357 A | 1/1980 | Swenson et al. | |
| 4,182,533 A * | 1/1980 | Arndt et al. | 297/284.4 |
| 4,295,681 A * | 10/1981 | Gregory | 297/284.4 |
| 4,529,247 A | 7/1985 | Stumpf et al. | |
| 4,541,670 A * | 9/1985 | Morgenstern et al. | 297/284.7 |
| 4,810,033 A * | 3/1989 | Kemmann | 297/284.4 |
| 4,915,447 A * | 4/1990 | Shovar | 297/284.11 |
| 5,326,155 A * | 7/1994 | Wild | 297/452.38 |
| 5,344,215 A * | 9/1994 | Dahlbacka | 297/375 |
| 5,411,316 A | 5/1995 | Lovegrove et al. | |
| 5,538,326 A | 7/1996 | Lorbiecki | |
| 5,718,476 A * | 2/1998 | De Pascal et al. | 297/284.4 |
| 5,810,438 A | 9/1998 | Newhouse | |
| 5,876,085 A | 3/1999 | Hill | |
| 6,092,871 A * | 7/2000 | Beaulieu | 297/284.4 |
| 6,688,687 B2 * | 2/2004 | Chu | 297/284.4 |

\* cited by examiner

*Primary Examiner* — David Dunn
*Assistant Examiner* — Tania Abraham
(74) *Attorney, Agent, or Firm* — Boyle Fredrickson, S.C.

(57) ABSTRACT

The present invention is directed to an adjustable seat occupant support assembly for a seat, such as a vehicle seat, which employs a drive equipped with an arm that bears against an adjuster shoe that urges part of a seat cushion of a backrest of a vehicle seat outwardly or inwardly. The adjustable support assembly is received in part of a molded seat shell that is three dimensionally formed to accommodate at least part of the lumbar adjuster drive. In a preferred embodiment, the shell has a molded drive-receiving compartment that can include a cradle that supports a drive received in the compartment. One or more integrally molded bearing support surfaces, including journals, can be formed in the shell upon which part of the drive can be movably supported. A drive actuator is provided that is also carried by an aperture or the like molded into the shell.

40 Claims, 13 Drawing Sheets

SEAT WITH ADJUSTABLE SEAT OCCUPANT SUPPORT ASSEMBLY AND INTEGRALLY FORMED SEAT SHELL THEREFOR

CROSS REFERENCE TO RELATED APPLICATION

This application claims priority under 35 U.S.C. §119(e) in U.S. Provisional Application Ser. No. 60/806,501, filed Jul. 3, 2006, the disclosure of which is hereby expressly incorporated by reference herein.

FIELD OF THE INVENTION

The present invention is directed to a seat with an adjustable seat occupant support assembly and more particularly to an adjustable seat occupant support assembly well suited for use as a back support adjustment assembly and which is particularly well suited for use with a seat shell that is of one-piece, unitary and substantially homogenous construction.

BACKGROUND

In the past, lumbar adjustment assemblies have been employed in vehicle seats to enable a seat occupant to adjust part of a vehicle seat, namely part of the backrest, to provide a desired amount of lumbar support for comfort. U.S. Pat. Nos. 4,564,235; 5,588,703; 5,505,520; 5,718,476; and 6,688,690, are a few examples of adjustable seat occupant support assemblies that are used to provide adjustable lumbar support to a seat occupant.

With reference to FIG. 1, manufacturers of seats that incorporate lumbar adjustment assemblies have used in the past, or are currently using, a conventional steel frame backrest. In one such lumbar adjustment system 20 shown in FIG. 1, the backrest frame (not shown) has structural cross members 22, which partially constrains one end of a centrally located, generally convex-bowed, flexible plate 24. This plate 24, which is typically made of steel or plastic, bears against foam (not shown) in the seat that is located in the backrest between the plate 24 and the back of a seat occupant (not shown). This plate 24 is acted upon by a threaded rod 26, which is axially fixed to the backrest frame, and a threaded nut-like element 28 that engages the free end of the convexly-bowed plate 24. As the rod 26 is rotated, the nut translates along the rod 26, which moves the free end of the convexly-bowed plate 24 relative to the constrained end. This increases or decreases the amount of the bow or curvature in the convexly-bowed plate 24. As the bow or curvature in the plate 24 changes, it changes the amount by which it displaces and applies pressure against the backrest foam toward or away from the lumbar region of a seat occupant. A load distribution pad (not shown) can be located between the convexly-bowed plate 24 and the backrest foam to help spread the force applied by the plate 24 to the foam more evenly along the foam. Manipulation of the backrest foam in this manner by changing the amount of bow or curvature in the convexly-bowed plate 24 changes the shape of and/or the amount of support provided by the backrest to the lumbar region of a seat occupant.

Although not shown, there is another more complex lumbar adjustment system that is also commonly used in seats with conventional steel backrest frames. This system is self-contained and is generally mounted to a backrest cross member with threaded fasteners. It includes a vertically-oriented, convex-shaped, cross-lattice element that is manufactured using steel or plastic strip material. The convex shape of the cross-lattice element is curved toward the backrest foam. This basic system is used with a variety of mechanisms to change the shape of the cross-lattice element. Any of these can be functionally illustrated by analogy using a simple archer's bow, with the bow representing the cross-lattice element, and the bow string representing the mechanism that controls the amount of arch, bow or curvature of the lattice element. As the ends of the lattice element are brought closed together, typically using a tensile member, the convex shape of the lattice element increases. Conversely, as the tensile element is relaxed the shape flattens out. The lattice type element generally bears directly on the foam of the backrest. Again, this manipulation of the backrest foam changes the shape of and/or the support provided by the lumbar region of the backrest.

A further type of lumbar adjustment system incorporates an inflatable air bladder positioned between a support element and the foam in a typical steel frame seat backrest. An example of such a system is shown in FIG. 20 of U.S. Pat. No. 5,658,050. One variant includes a hand squeezed bulb to pump up the bladder to increase its cross section, and an inline needle type valve that can opened to decrease the pressure in the bladder and reduce its cross section. Typically the bladder acts directly on the foam in the seat backrest. Again, manipulation of the backrest foam changes the shape of and/or the support provided by the lumbar region of the backrest.

While many of these adjustable seat occupant support assemblies and systems have enjoyed commercial success in the past, their complexity and cost has prohibited their application to lower cost off-road vehicle seating.

SUMMARY

The present invention is directed to a seat that includes a molded seat shell that is integrally formed for use with an adjustable seat occupant support assembly that, in one currently preferred embodiment, is an adjustable lumbar support assembly. In a currently preferred embodiment, the seat is a vehicle seat that includes a molded plastic seat shell, an adjustable seat occupant support assembly carried by the shell, and an outer seat cover which is attached to the shell, which overlies the adjustable seat occupant support assembly, and which provides a seat occupant supporting surface upon which a seat occupant sits. While the seat occupant support assembly is carried by a backrest portion of the shell in a currently preferred embodiment where back support is provided, it can be incorporated in the seat portion of the shell, such as where it is desired to provide an adjustable bolster or thigh support.

The shell includes a molded shell body that has a compartment integrally formed in it in which at least part of the adjustable seat occupant support assembly is disposed. In a preferred embodiment of the shell body, the compartment includes a cradle that helps support part of the adjustable seat occupant support assembly. The cradle can be and preferably is integrally molded with the rest of the shell body. An aperture molded in the shell body accommodates at least part of an actuator used in operation of the adjustable seat occupant support assembly.

The adjustable seat occupant support assembly includes a drive that is received in the compartment molded in the shell body, an effector that cooperates with the drive to displace part of the seat cover relative to part of the body of a seat occupant sitting in the seat when the drive is actuated, and an actuator that operably cooperates with the drive. The drive is manually operated such as by a seat occupant or the like. The effector is driven by the drive to displace part of the of the seat cover. In a preferred embodiment, the actuator is manipulable and coupled to the drive.

The drive includes an elongate rotary armature that is equipped with at least one arm that is composed of one or more multi-lobed cams. During operation, drive rotation correspondingly moves a cam that in turn operably cooperates with the effector. In a preferred embodiment, the drive has a plurality of arms that each has at least one cam with an interconnecting mandrel extending between the arms that are supported by the cradle of the shell when the drive is disposed in the compartment. The drive includes a rod that extends outwardly from an axial end of at least one of the arms that functions as a trunnion that is rotatively received in an aperture formed in the shell. At least part of the aperture forms a journal, such as a saddle bearing, that rotatively supports the trunnion rod when the drive is assembled to the shell. In a preferred embodiment, there is a trunnion rod extending outwardly from each drive arm that is rotatively received in a corresponding aperture formed in the shell.

To help facilitate assembly, each end of the compartment adjacent one of the apertures has an assembly clearance channel formed therein that enables a corresponding trunnion rod of the drive to be inserted into one of the apertures. Once each trunnion rod is inserted into a respective one of the apertures, the drive is releasably retained in the compartment such that it is assembled to the shell in a manner that permits the drive to rotate relative to the shell. Where equipped with an interconnecting mandrel between drive arms, the saddle can rotatively support the drive while preventing it from moving in an axial direction relative the shell thereby helping to keep each trunnion rod seated in its respective shell aperture. Such a construction enables assembly to be advantageously performed without the use of any tool.

The actuator operatively cooperates with the drive to control drive operation to enable adjustment of the adjustable seat occupant support assembly to be performed. Where the drive includes a pair of trunnion rods, there is an actuator that is operatively coupled to each trunnion rod. In a preferred actuator embodiment, each actuator is a knob that releasably engages one end of a corresponding trunnion rod. In a preferred embodiment, each knob has a coupler that is at least partially inserted into a corresponding shell aperture where it receives and releasably receives part of a trunnion rod. In one preferred embodiment, the coupler snaps onto the free end of a corresponding one of the trunnion rods advantageously without requiring the use of any tool.

The effector is a displaceable shoe that is disposed between the drive and the outer seat cover. Where the shoe is configured for use to provide adjustable lumbar support, the shoe is located in the backrest where its outward displacement would cause it to urge part of the seat cover to bear against at least part of the lower back of a seat occupant sitting in the seat.

In a preferred embodiment, the shoe is a plate made of plastic or metal. The shoe plate is attached at or adjacent one end or side to the shell and has its opposite end or side free to facilitate displacement toward and/or away from a seat occupant in response to movement of the driver. In a preferred embodiment, the shoe plate is flexible to further facilitate ease of displacement while at the same time helping it to remain attached to the shell. In a preferred embodiment, the shell can be formed with an integral receptacle or retainer that facilitates attachment of the shoe plate to the shell.

An adjustable seat occupant support assembly constructed in accordance with the present invention advantageously uses a minimum of components, is of simple construction, and is particularly well suited for use in off-road vehicle seats that tend to be of more compact in size, tend to employ molded plastic seat shells, and must be economical to produce. An adjustable seat occupant support assembly constructed in accordance with the present invention advantageously can also be compact, economical to manufacture, simple to assemble, easy to operate, and is durable and long-lasting.

DRAWING DESCRIPTION

The drawings illustrate the best mode currently contemplated of practicing the present invention. In the drawings.

Figure 14:
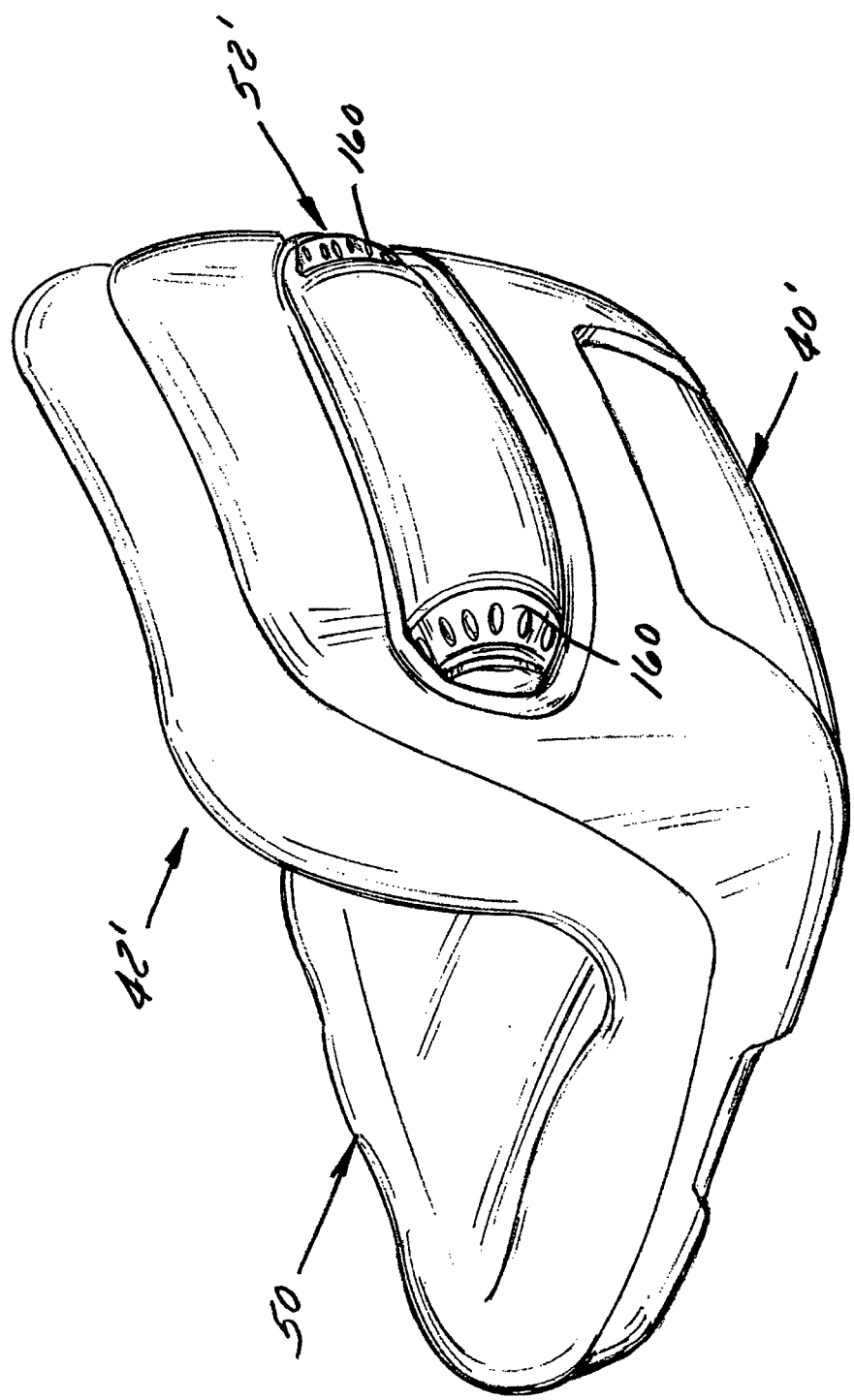
Figure 16:
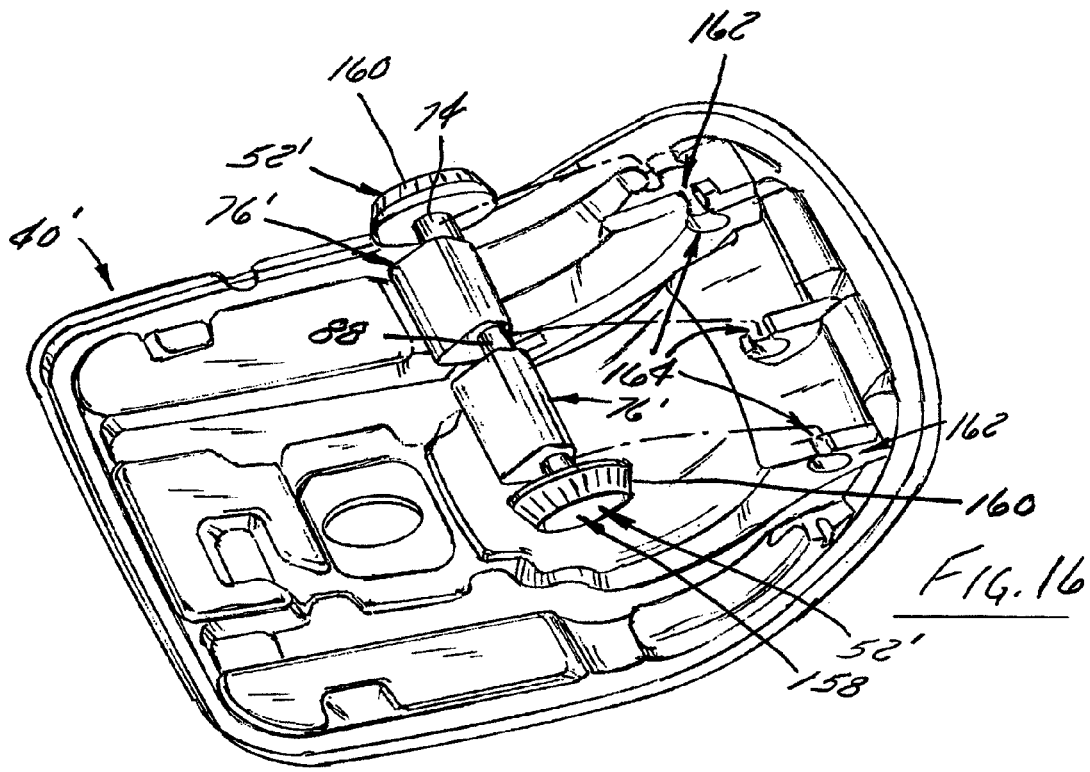
Figure 15:
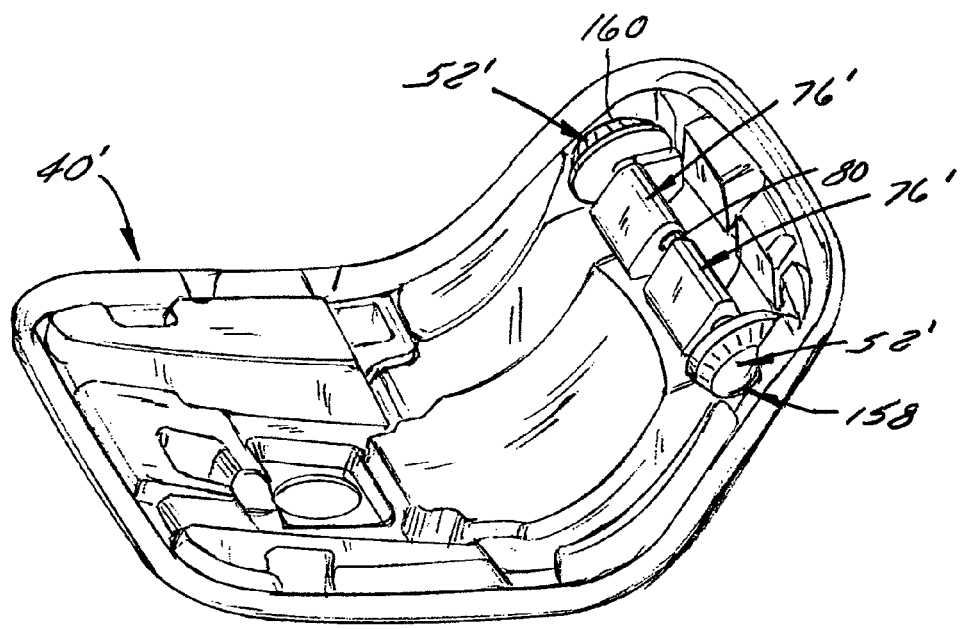

FIG. 14 illustrates a rear perspective view of a vehicle seat equipped with a second preferred back support adjustment assembly embodiment; and FIG. 15 illustrates a front right perspective view of the second preferred back support adjustment assembly assembled to a vehicle seat shell; and FIG. 16 illustrates a front right perspective view of the vehicle seat shell and second preferred back support adjustment assembly with the second preferred back support assembly exploded from the seat shell.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
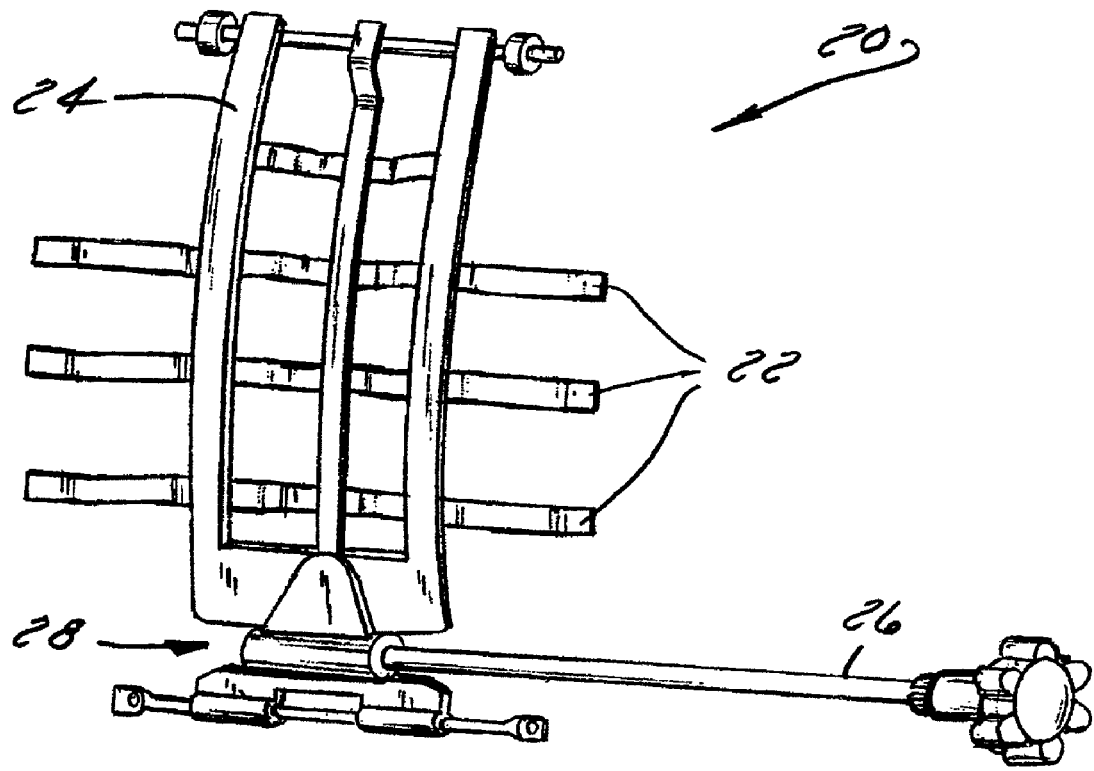
FIG. 1 is a front elevational perspective view of a prior art lumbar adjustment assembly.
Figure 2:
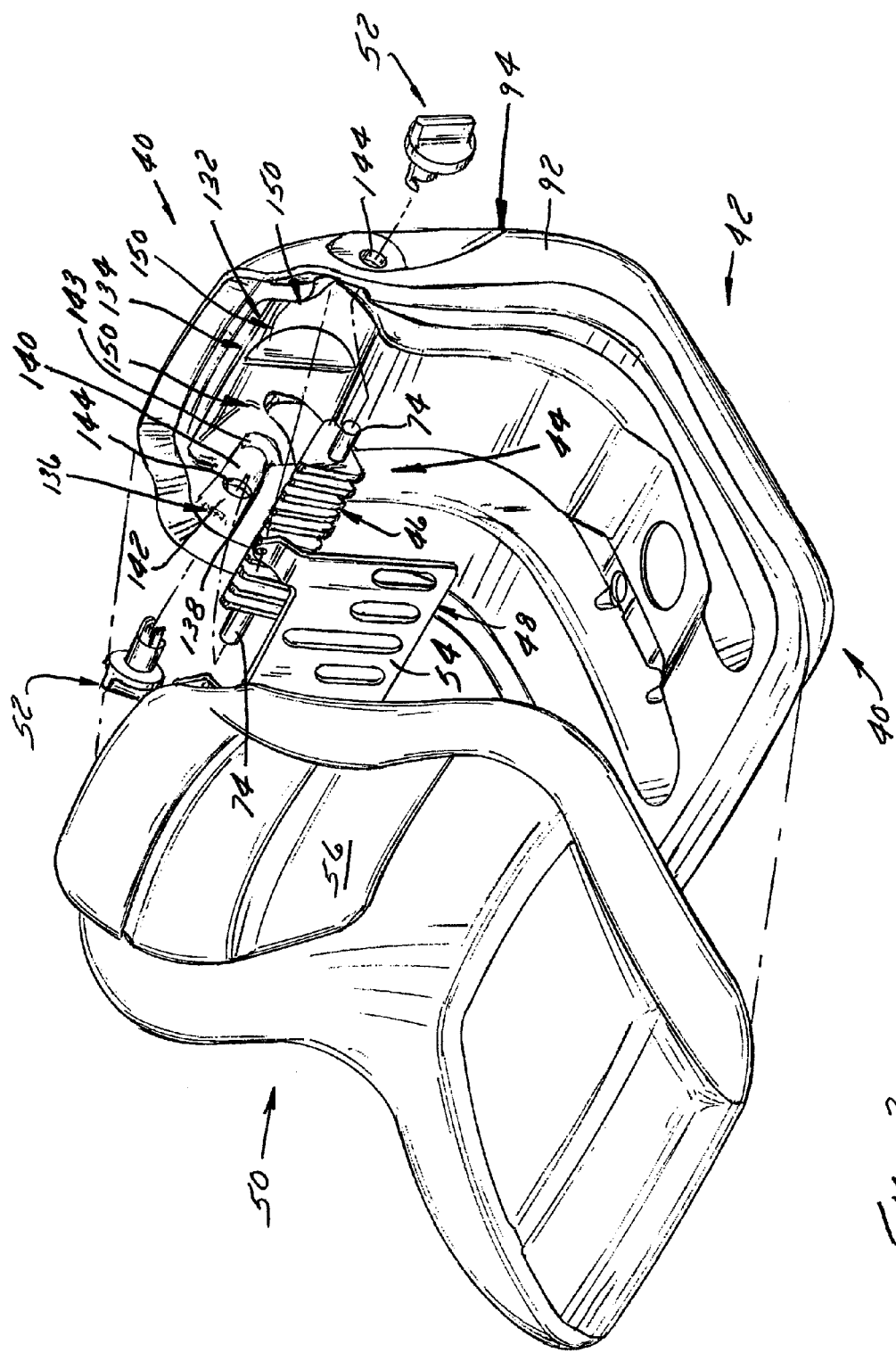
FIG. 2 is a perspective exploded view of a preferred embodiment of a molded seat shell and integrated back support adjustment assembly constructed in accordance with the present invention.
Figure 3:
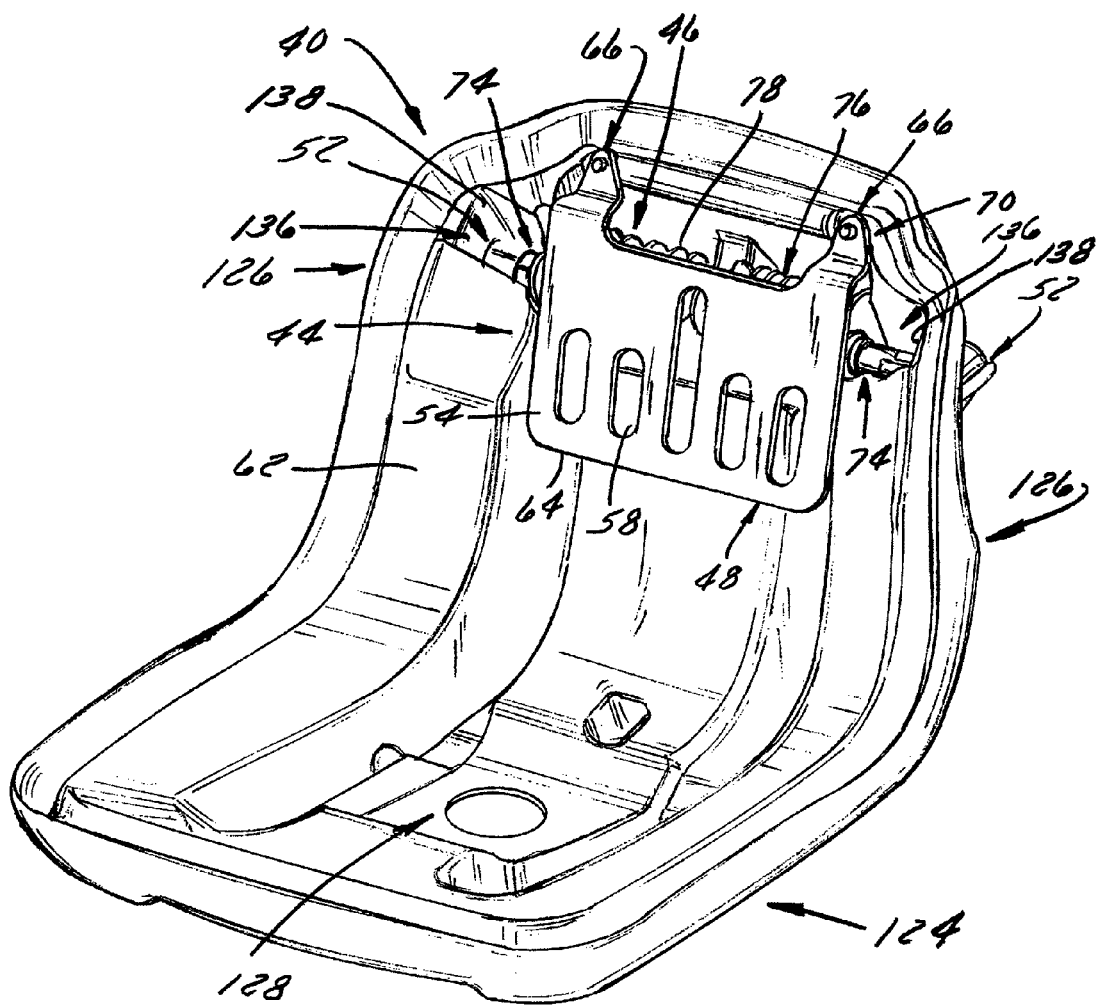
FIG. 3 is a perspective view of the molded seat shell and back support adjustment assembly of FIG. 2 assembled to the shell.
Figure 4:
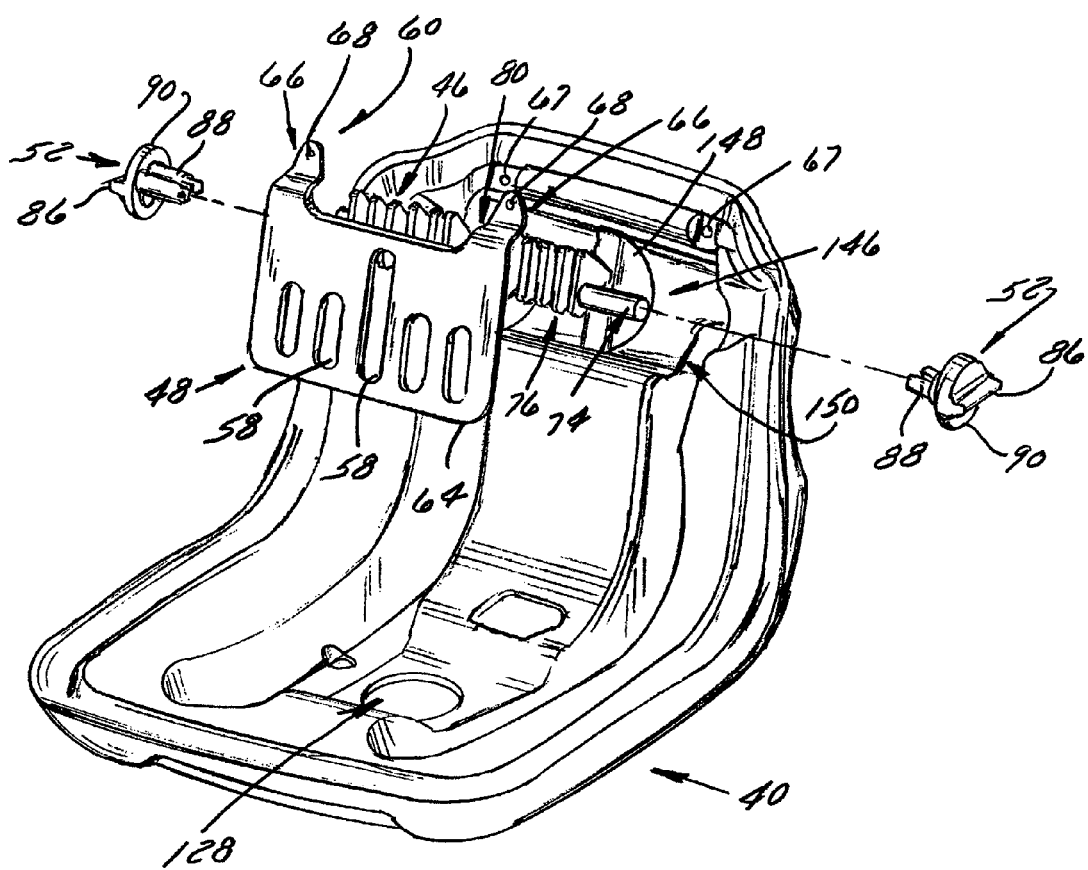
FIG. 4 is a perspective view of the molded seat shell of FIGS. 2 and 3 with the back support adjustment assembly exploded.

With reference to FIGS. 2-4, a molded seat shell 40 of a vehicle seat 42 carries an adjustable seat occupant support assembly 44 that is an adjustable back support assembly 44 constructed in accordance with the present invention with the shell 40 being three-dimensionally contoured to receive, locate, and help hold the adjustable back support assembly 44 in place. The vehicle seat 42 preferably is an off-road vehicle seat for an off-road vehicle (not shown) like a tractor, an ATV, a riding lawn mower, a snowmobile, a backhoe, a bulldozer, a front end loader, or another kind of off-road vehicle.

The adjustable back support assembly 44 includes an adjuster drive 46 carried by the shell 40, which cooperates with an adjuster shoe 48 when moved from a first back support adjustment position to another back support adjustment position disposed from the first position. The shoe 48 serves as an effector that is urged by the drive 46 against part of a seat cover 50 that overlies the adjustment assembly 44 and shell 40 to correspondingly displace the seat cover 50 when the drive 46 is moved from one position to another position. When the drive 46 is moved in one direction, the shoe 48 urges part of the seat cover 50 outwardly or otherwise modifies part of the shape of the outer seat cover 50. When the drive 46 is moved in the opposite direction, the shoe 48 is retracted causing the seat cover 50 to displace inwardly. The drive 46 can operatively cooperate with a manipulable actuator 52, at least part of which is located outside the shell, enabling it to be accessed by a seat occupant (not shown) or the like.

The adjuster shoe 48 is a plate or sheet 54 that makes contact with an inner surface 51 of the seat cover 50, displacing the seat cover 50 outwardly in response to force and/or displacement applied due to operation of the adjuster drive 46. If desired, the shoe 48 can instead bear against foam (not shown) disposed within the vehicle seat backrest that underlies the outer surface of the seat cover 50. If desired, the shoe 48 can also bear against a load distribution pad (not shown) that can either underlie the inner seat cover surface 51 or foam within the backrest where the vehicle seat backrest is equipped with foam or padding.

The shoe 48 underlies a part 56 of the seat cover 50 that generally underlies part of the back, e.g. lumbar region, of an occupant sitting in the seat 42. In the preferred embodiment shown in FIGS. 2-4, the shoe 48 has a large enough surface area so as to underlie at least a plurality of lumbar vertebrae of the seat occupant. In one preferred embodiment, the shoe 48 underlies at least a plurality of pair, i.e. at least three, of lumbar vertebrae of a seated seat occupant. While the shoe 48 can directly underlie the seat cover 50, it can also underlie a portion of a cushion, such as a cushion made of open or closed cell foam or the like, or a pad which in turn underlies the seat cover 50.

The shoe 48 shown in FIGS. 2-4 is generally rectangular or the like with it being of self-supporting construction. In one preferred embodiment, the shoe 48 is formed of a metallic or plastic sheet or plate 54 that is substantially rigid so as to displace substantially in unison with drive displacement. In the preferred shoe embodiment shown in FIGS. 2-4, the shoe plate 54 is of substantially planar construction and has a thickness thin enough where it can deflect at least somewhat in response to the load a seat occupant places upon that part of the seat 42 including during vehicle use and operation. The shoe 48 can have holes in it, such as the generally vertically extending oblong apertures 58 shown in FIG. 2. Such holes or apertures 58 help reduce weight and can decrease the stiffness of the shoe.

The shoe 48 is disposed within the vehicle seat 42 in a manner where it is positioned between the seat shell 40 and the seat cover 50 with the shoe 48 also overlying at least part of the adjuster drive 46. In the preferred embodiment shown in the drawing figures, the shoe 48 is anchored adjacent or along at least one side to the seat shell 40. For example, FIGS. 2-4 depict the shoe 48 being anchored along at least part of a top portion 60 of the shoe 48 to part of inner surface 62 of the shell 40.

In the preferred embodiment shown in FIGS. 2-4, the shoe 48 is fixed to the shell 40 only adjacent or along the top edge of the shoe 48 such that its bottom side or bottom edge 64 is unconstrained (except in a fore-aft direction by the seat shell and seat cover). If desired, the shoe 48 can be mounted to the shell 40 at or adjacent its bottom edge or bottom side 64 with it left unconstrained along its top edge or top side 60. However, in the presently preferred embodiment shown in FIGS. 2-4, the shoe 48 is attached to the shell 40 adjacent or along the top edge or top side 60 of the shoe 48.

In the preferred shoe embodiment shown in FIGS. 2-4, the shoe 48 has a pair of spaced apart anchor arms 66 that extend outwardly along the shoe top edge 60 that are each used to attach the shoe 48 to the shell 40. Each arm 66 preferably has a bore 68 through it for cooperation with some sort of attachment arrangement 70. In one preferred embodiment, the attachment arrangement 70 is a fastener 72, such as a screw, can be used to attach each shoe anchor arm 66 to the shell 40. If desired, the shell 40 can have a screw pilot hole 67 or the like formed in the shell 40. Such a pilot hole 67 preferably can be integrally formed in the shell 40 during molding of the shell 40.

In another embodiment, the attachment arrangement includes a boss (not shown) that extends outwardly from the inner seat shell surface 62. If desired, the boss can be configured as a snap (not shown) that has a plurality of slightly spaced apart snap halves (not shown) that each have a hook or tab (not shown) that can be inserted through one of the bores 68 in one of the shoe anchor arms 66. Where configured with a snap, each snap engages a corresponding one of the shoe anchor arms 66 preferably by its hook or tab providing an interference fit with the arm 66 thereby opposing and preferably preventing withdrawal or disengagement. Where configured with a snap, it can be integrally molded with the seat shell 40.

The adjuster drive 46 includes a trunnion 74 at each end that is releasably received and supported by the shell 40 in a manner that facilitates drive displacement enabling lumbar support adjustment. The drive 46 includes at least one drive arm 76 located between the trunnions 74. In the preferred embodiment shown in FIGS. 2-4, the drive 46 has at least a plurality of spaced apart drive arms 76 located between the trunnions 74.

In a preferred method of operation, the adjuster drive 46 is manually driven. For example, the adjuster drive 46 is manually drivable through manipulation of one or both actuators 52. During operation, an operator and/or seat occupant can simply grasp one or both actuators 52 and turn it to rotate the drive 46 to carry out adjustment of lumbar support.

In the preferred embodiment shown in FIGS. 2-4, each drive arm 76 includes at least one cam 78 that is mounted on or otherwise connected by a mandrel 80 extending between adjacent drive arms 76 where the drive 46 is equipped with a plurality of arms 76. Each cam 78 preferably is substantially identical and can be eccentrically mounted. In the preferred cam embodiment shown in FIGS. 2-4, each cam 78 is generally triangularly shaped having corners or lobes 82 that each can be rounded to help facilitate smoothness of adjustment.

To help structurally rigidify the drive 46, the drive 46 preferably is constructed with at least one axially or longitudinally extending rib 84 extending between at least a plurality of adjacent cams 78. In a preferred embodiment, there is a plurality of such ribs 84 extending between at least a plurality of adjacent pairs of cams 78.

In a preferred embodiment, the adjuster drive 46, including its trunnions 74 and each drive arm 76 or cam 78 is of one-piece, unitary and substantially homogenous construction. In a currently preferred embodiment, the drive 46 is made of a moldable material. One preferred type of moldable material is an injection moldable resin or polymeric material. In a preferred method of manufacture, the drive 46 is injection molded of plastic.

Figure 5:
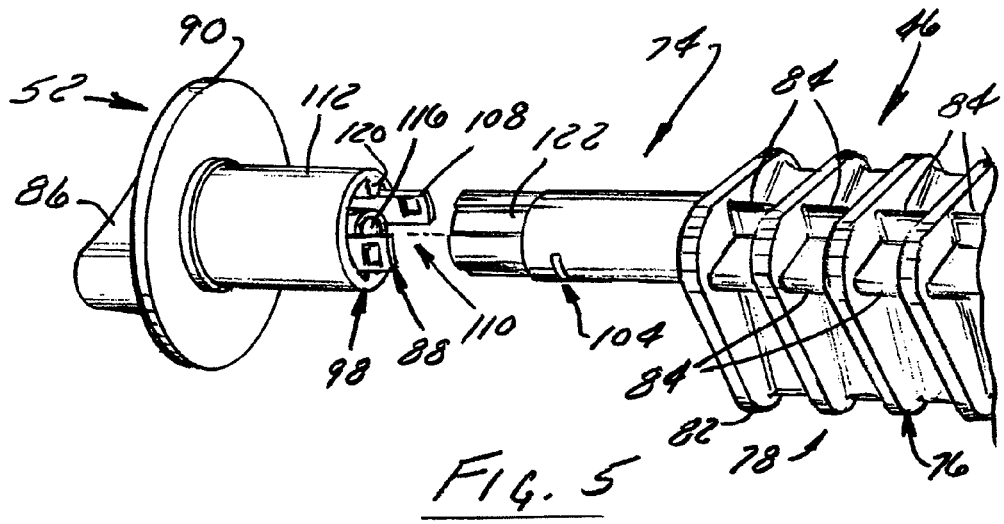
FIG. 5 is a fragmentary exploded perspective view of a back support adjuster drive and actuator.
Figure 6:
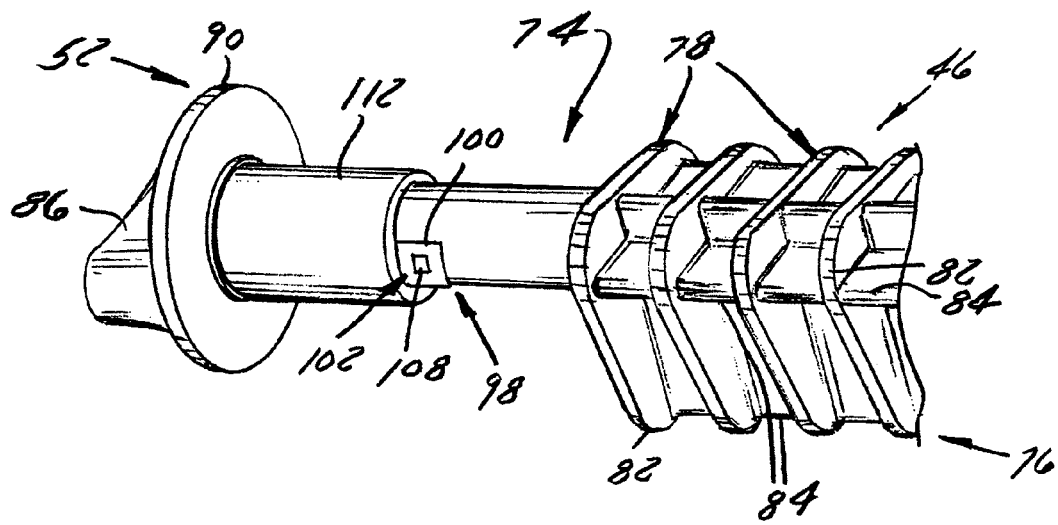
FIG. 6 is a fragmentary perspective view of the drive and actuator of FIG. 5 showing the actuator coupled to the drive.
Figure 7:
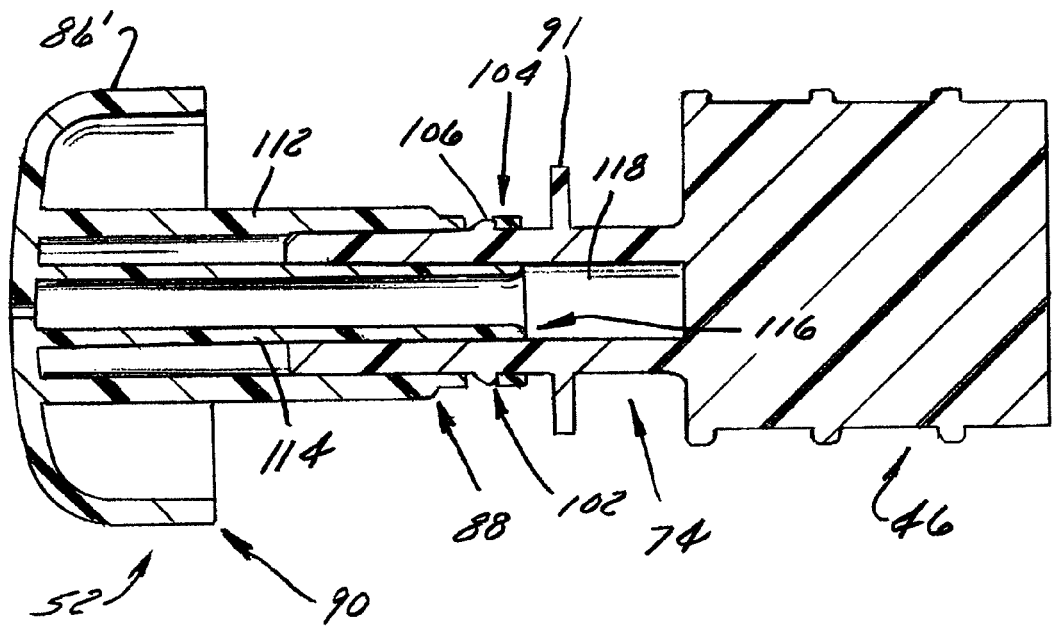
FIG. 7 is longitudinal cross sectional view of the drive with the actuator attached.

With reference to FIGS. 5-7, each actuator 52 includes a grip 86, such as a knob or the like, that is capable of being manually grasped and displaced, preferably by turning or rotating it. The actuator 52 also includes a socket 88 separated from the grip 86 by a flange 90 that slidably bears against an outer surface 92 of a corresponding shell sidewall 94 during actuator rotation. The socket 88 shown is tubular and configured to mate with the free end 96 of one of the driver trunnions 74. In the preferred embodiment shown in FIG. 7, the socket 88 is constructed and arranged to mate with one of the driver trunnions 74 in a manner such that rotation of the actuator 52 rotates the drive 46 substantially in unison therewith. As is shown in FIG. 7, each actuator socket 88 and the corresponding trunnion free end 96 is tubular and configured such that one is telescopically received within the other during assembly.

A plurality of retainers 98 extend outwardly from an axial end of the socket 88 with each retainer 98 engaging part of the trunnion 74 in a manner that prevents the actuator 52 from disengaging and separating from the trunnion 74. In the preferred embodiment shown in FIGS. 5-7, each retainer 98 includes a finger 100 with a detent 102 formed in it that releasably receives a snap hook 104 upraised from the trunnion 74 that has an inclined leading surface 106 to enable the actuator retainer finger 100 to flex and cam over the hook 104 during telescopic insertion of the trunnion 74 into the actuator socket 88 (and vice versa) until the hook 104 is received in the detent 102. When the hook 104 is seated in the detent 102, interference between the hook 104 and retainer finger 100 opposes disengagement of the drive actuator 52 from the trunnion 74 to which it is attached. In the preferred embodiment shown in FIGS. 5-7, the detent 102 preferably is an opening 108 having a shape complementary to that of at least part of the snap hook 104.

As is best shown in FIG. 7, the socket 88 includes an annular and elongate receptacle 110 defined by the space between an outer socket wall 112 and an inner annular elongate wall 114 of an axially extending hub 116 generally coaxially nested within the outer socket wall 112. The socket hub 116 is received in an elongate axial bore 118 formed in the trunnion 74 with adjacent walls or facing surfaces of the actuator 52 and trunnion 74 engaging one another when assembled in a manner that opposes prevents relative rotation between the assembled actuator 52 and trunnion 74.

In one preferred embodiment, these engaging surfaces are axially ribbed or keyed in a complementary manner such that assembly of actuator 52 to trunnion 74 causes ribs or keys formed in at least one trunnion facing surface(s) of the actuator socket 88 and/or hub 116 to be received between adjacent rib pairs or key pairs formed in at least one surface of the trunnion 74 facing a corresponding adjacent surface or wall of the socket 88 and/or hub 116 to thereby at least oppose, if not preferably substantially completely prevent relative rotation between actuator 52 and trunnion 74.

One or more of these complementary mating surfaces preferably includes a larger or wider key 120 (FIG. 5) that is received in a corresponding complementary slot or keyway 122 formed in the other one of these one or more complementary mating surfaces. Such a wider key and keyway arrangement also helps prevent relative rotation between the drive actuator 52 and corresponding trunnions 74 while preferably also helping to angularly locate one relative to the other during assembly, where such angular location is desired. In the preferred embodiment shown in FIGS. 5 and 6, there are a plurality of such keys 120 and keyways 122 preferably generally equiangularly spaced apart about the respective socket wall 112 and trunnion 74.

It will be apparent to one skilled in the art that one or more of the various structures disclosed herein as being part of the drive actuator 52 can be formed as part of the trunnion 74 and vice versa. Additionally, actuator grip 86 can take the form of a knob 86', like the knob disclosed in FIG. 7, instead of the flange-like grip 86 depicted in FIGS. 5 and 6.

Figure 8A:
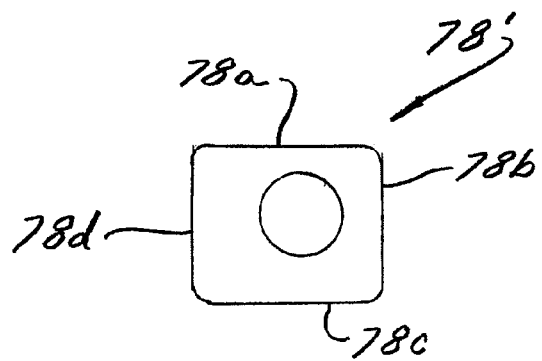
FIG. 8A illustrates an end view of a second preferred embodiment of a back support adjuster drive equipped with a four-lobed cam.
Figure 9:
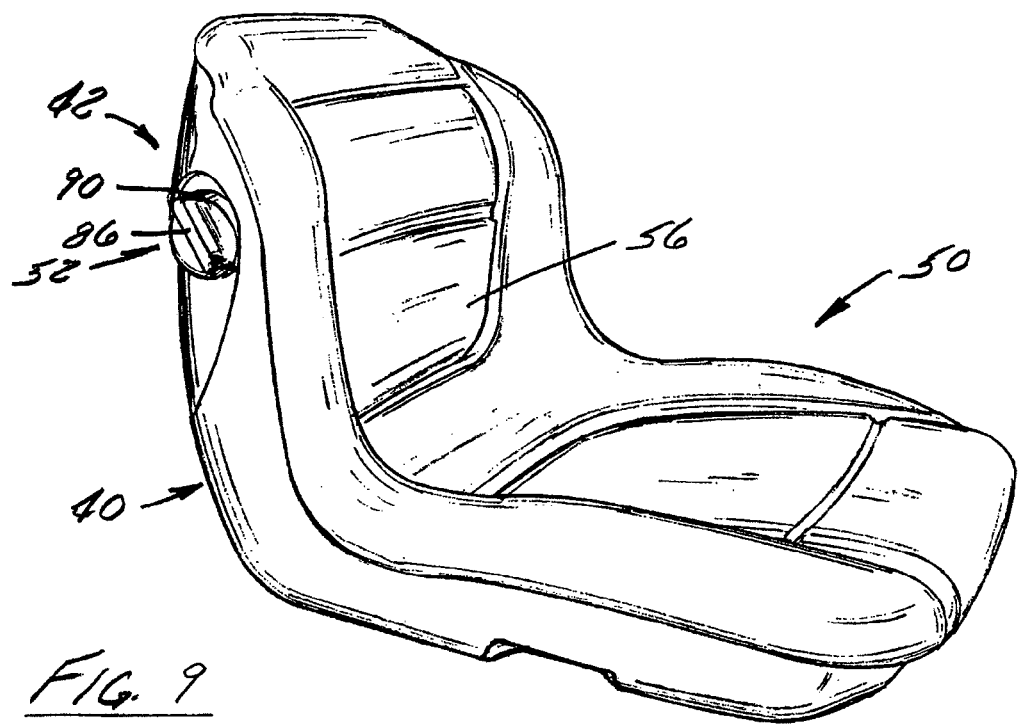
FIG. 9 is a front left-side perspective view of a vehicle seat equipped with an integral back support adjustment assembly constructed in accordance with the present invention.
Figure 8B:
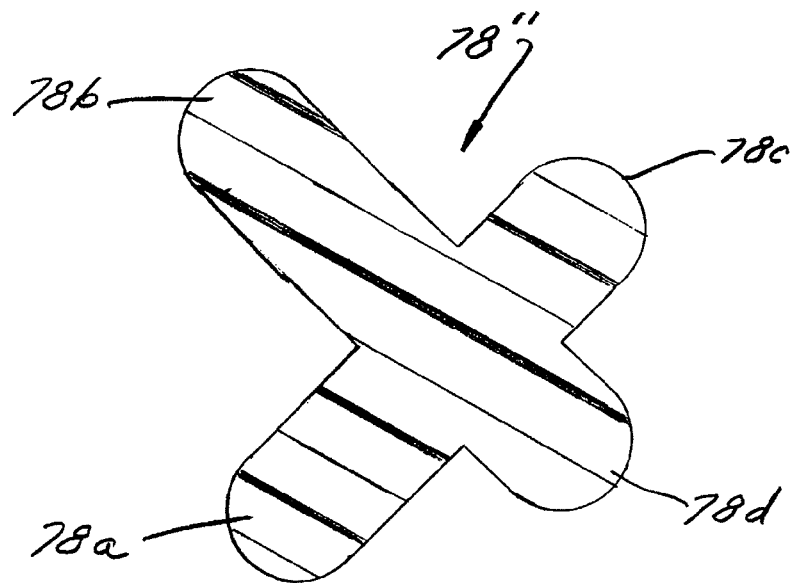
FIG. 8B shows cross section view of a third preferred embodiment of a back support adjuster drive equipped with a four-lobed cam.
Figure 10:
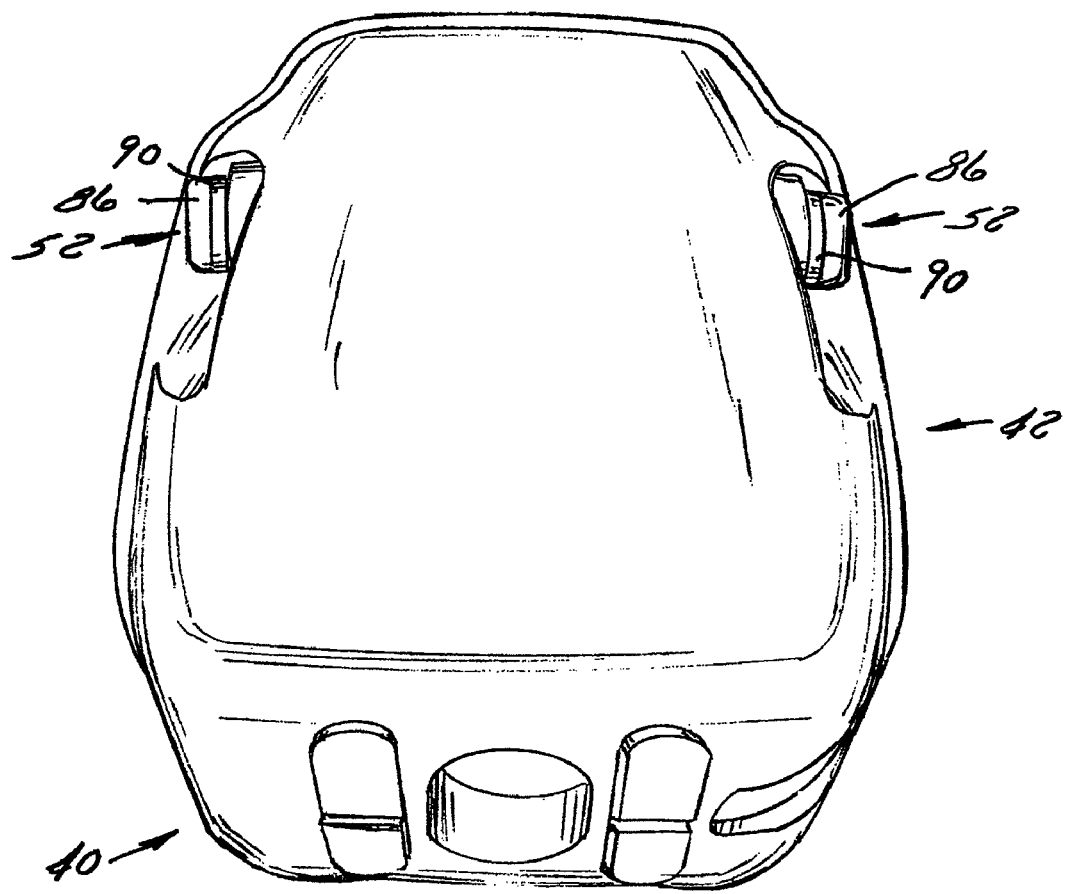
FIG. 10 is a rear perspective view of the back support adjustment assembly equipped seat of FIG. 9.

While the lumbar adjuster drive 46 shown in FIGS. 2-7 has three-lobed cams 78, the drive can be configured with cams having a different number of lobes. For example, as is shown in FIGS. 8A and 8B, a drive 46' for a lumbar support adjustment assembly constructed in accordance with the present invention can be equipped with four cam lobes 78a-78d that provide additional increments of adjustment. For example, in the preferred drive embodiment shown in FIGS. 8A and 8B, each cam lobe 78a-78d has a different radially outward extent or length facilitating additional adjustment increments. In a currently preferred embodiment, the drive preferably has at least a plurality of pairs, i.e. at least three, of such cams 78. In addition, while each drive 46 is preferably equipped with a plurality of drive arms 76, such as is depicted in FIGS. 3, 13, 15 and 16, the drive 46 can be constructed with a single substantially contiguous drive arm 76 such that the drive 46 lacks any kind of a mandrel 80 or the like disposed between adjacent pairs of drive arms 76.

The seat shell 40 shown in the drawing figures is made of a moldable material that can be and preferably is a moldable material suitable for use in blow molding. If desired, a shell 40 constructed in accordance with the invention can also be injection molded or rotocast. In one preferred embodiment, a seat shell 40 constructed in accordance with the invention is blow molded of a suitable molding material that preferably is plastic in composition. Examples of suitable and preferred materials include a polyethylene, such as medium density polyethylene, high density polyethylene, high molecular weight polyethylene, and/or ultra-high molecular weight polyethylene, a polypropylene, or another suitable moldable material that preferably is of resinous and/or polymeric composition.

The seat shell 40 has a seat occupant supporting seat portion 124 that extends generally horizontally so as to underlie the buttocks and part of the legs of a seat occupant (not shown) and has a generally upright backrest section 126 that is located behind the back of the seat occupant. The shell 40 can have an opening 128 in its bottom, such as for accommodating one or more various features, such as a passenger switch, etc. (not shown). If desired, bracketry 130 and fasteners (not shown) can be used to facilitate mounting of the shell to a vehicle that preferably is an off-road vehicle.

As is best shown in FIGS. 2-4, 10, 12 and 13, the lumbar support adjustment assembly 44 is located behind the back of the seat occupant between the seat cover 50 and the seat shell 40 with it being positioned so as to be able to provide adjustable support to the lumbar region of the back of the seat occupant. It preferably is constructed and arranged so as to be able to selectively increase or decrease the amount of support provided to at least a plurality of lumbar vertebra of a seat occupant by enabling the distance between the outer surface of the supporting area of seat cover and the seat shell to be correspondingly selectively varied. Such a distance preferably is defined from the outer seat cover surface and a reference surface of the shell 40, e.g. an interior or exterior shell surface that faces generally toward or away from the lumbar region of a seat occupant sitting in the seat. In one preferred embodiment, the lumbar support adjustment assembly 44 provides adjustable lumbar support to at least a plurality of pairs, i.e., at least three, of lumbar vertebra.

There is an integrally formed lumbar support adjustment assembly receiving pocket 132 in the seat shell 40 that preferably defines a cradle 134 that is three dimensionally contoured and recessed so as to receive, retain and at least partially house the lumbar support adjustment assembly 44 between the shell 40 and the seat cover 50. The cradle 134 preferably is constructed and arranged so as to engage the adjuster drive 46 at a plurality of locations along the length of the drive 46. The cradle 134 preferably engages the drive a manner that preferably not only locates the drive 46 relative to the shell 40, shoe 48, seat cover 50, and the lumbar region of a seat occupant, but also in a manner that makes it quick and easy to assemble and remove (such as for servicing or the like).

The cradle 134 preferably includes a pair of spaced apart generally fore-aft extending channels 136 formed to accept one of the trunnions 74 of the adjuster drive 46. One of the channels 136 is located adjacent and preferably along one outside edge or sidewall 94 of the shell 40 and the other one of the channels is located adjacent and preferably along the other outside edge or sidewall 94 of the shell 40. Each channel 136 has a bottom guide wall 138 that is generally downwardly inclined by at least a slight amount, e.g. at least 5° relative to horizontal, so as to help keep the trunnions 74 of the adjuster drive 46 seated in the cradle 134, particularly during assembly.

Each trunnion-receiving channel 136 also has an end wall 140 and a sidewall 142. In the preferred embodiment shown in FIGS. 2-4 and in FIGS. 9-13, the end wall 140 of each channel has an aperture 144 to allow part of the free end of the drive trunnion 74 received in the channel 136 to be externally accessible for installation of the actuators 52. The outer sidewall 142 of each channel 136 helps axially locate the drive, especially during assembly. In a preferred embodiment, both channel sidewalls 142 taper or converge toward one another in the fore-aft direction at least slightly so as to help ensure drive location during insertion of the drive trunnions 74 into the corresponding channels 136.

With reference to FIGS. 2 and 7, one of the trunnions 74 has an asymmetrical feature 91 that aligns with a complimentary recessed relief 143 formed in part of the cradle 134 located adjacent to one of the end walls 140 during adjuster drive assembly to the shell. The other end wall 140 lacks such a relief 143 preventing the adjuster drive 46 from being installed incorrectly.

Each drive end-receiving channel end wall 140 helps locate the adjuster drive 46 in a fore-aft direction relative to a seat occupant sitting in the seat 42 because the outer socket wall 112 of the corresponding actuator 52 received in the channel 136 abuts against the end wall 140. Each end wall 140 preferably is curved or arcuately contoured so as to provide a bearing surface for the corresponding outer socket wall 112 received in the associated channel 136, helping smoothly facilitate drive displacement during seat occupant support adjustment. In a preferred embodiment, each curved or arcuately contoured channel end wall 140 preferably serves as a journal surface to facilitate rotation of the drive 46 by enabling rotation of the corresponding outer socket wall 112 received in the associated channel 136.

The cradle 134 also includes at least one intermediate adjuster drive locator 146 that preferably is an upraised rib 148 that is located between a pair of adjacent drive arms 76 of the adjuster drive 46 when the drive 46 is seated in the cradle 134. Such an upraised rib 148 provides an additional journal surface contacting and supporting the cylindrical mandrel 80 at the mid point of the drive 46 between the drive arms 76 (or a cam 78 of the arm 76 where so equipped) to oppose movement or distortion of the drive 46 when loaded by the seat occupant. If desired, the upraised rib 148 can be formed with an arcuate drive seat (not shown in FIGS. 2-14) for rotatively receiving and supporting the generally cylindrical mandrel 80 of the drive 46. If desired the upraised rib 148 can be formed with an arcuate recess formed within the accurate drive seat (not shown) for rotatively receiving a circular disk (not shown) located on the cylindrical mandrel 80 at the mid point if the drive 46 to interfere with side to side or axial movement of the drive 46.

Figure 11:
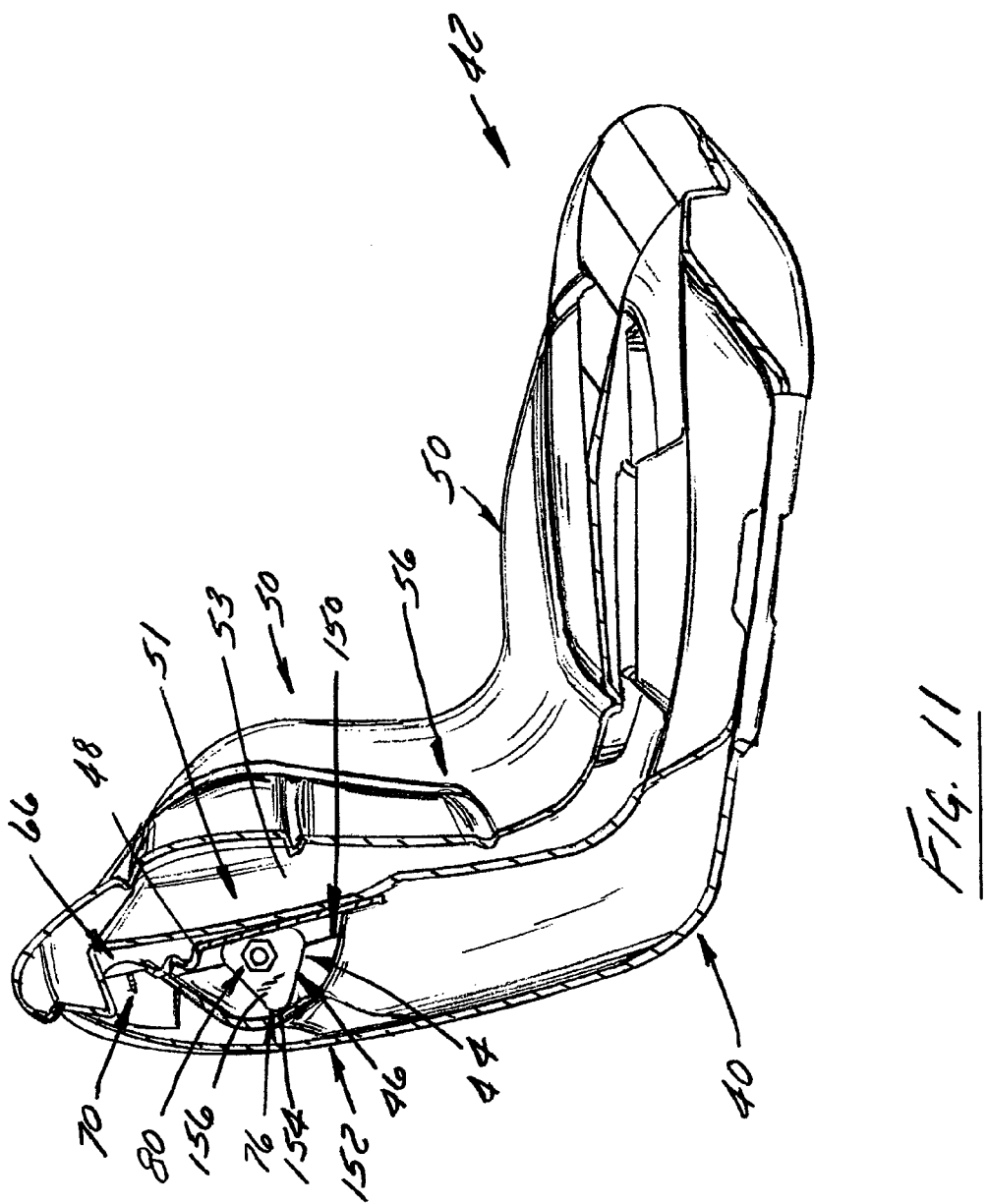
FIG. 11 is a side elevation cross sectional view of the back support adjustment assembly equipped seat of FIG. 9.
Figure 12:
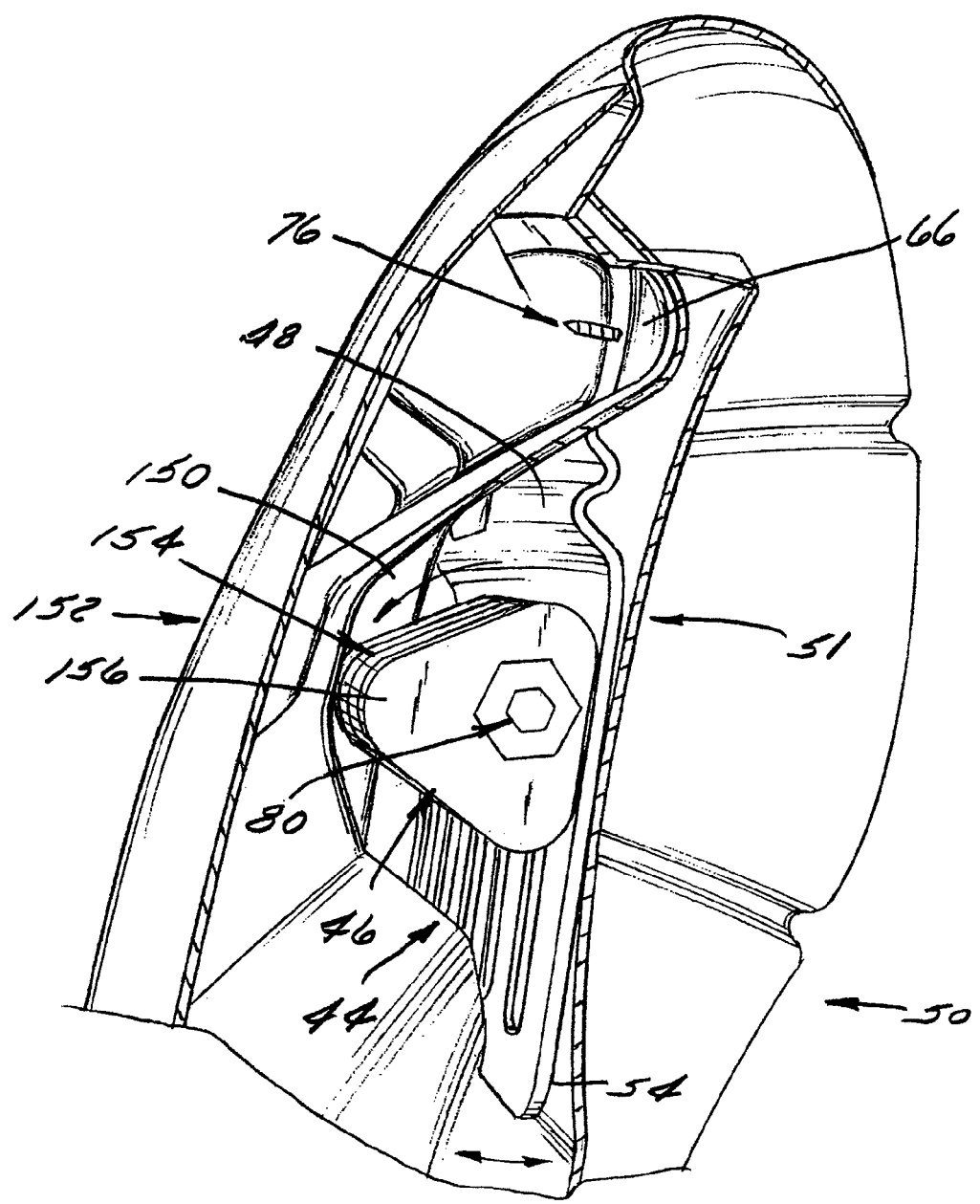
FIG. 12 is an enlarged fragmentary side elevation cross sectional view of the back support adjustment assembly equipped seat of FIG. 9.
Figure 13:
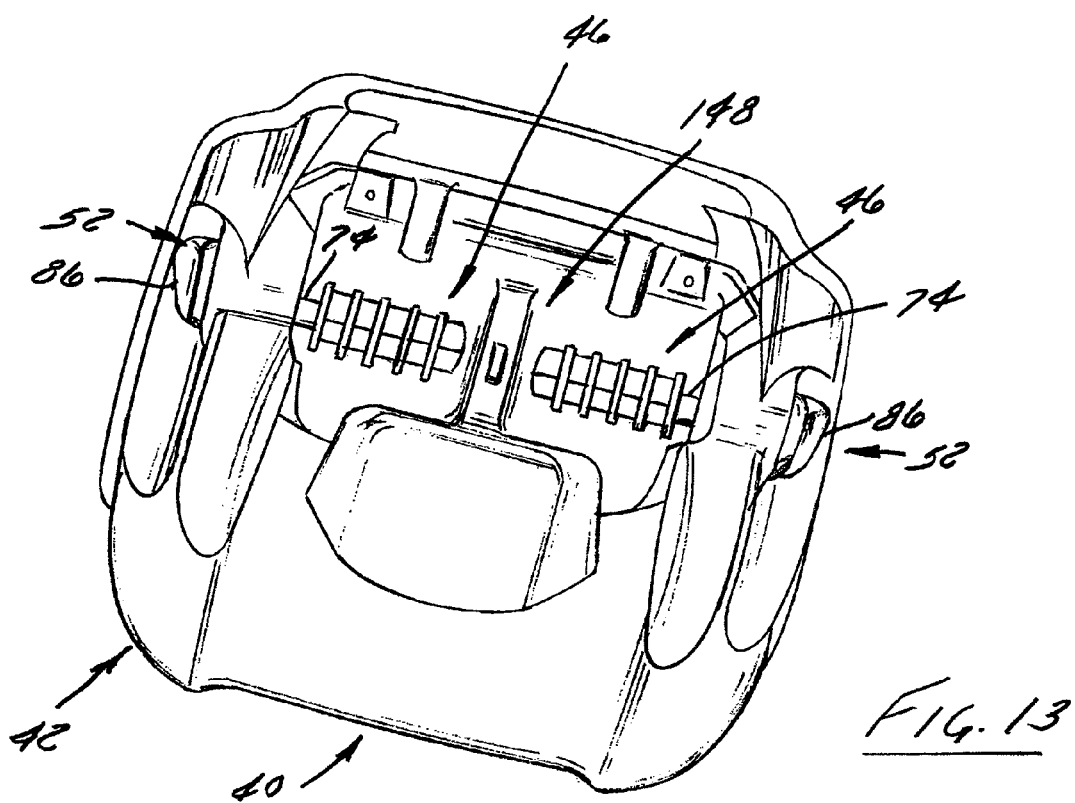
FIG. 13 is a rear perspective view of the back support adjustment assembly equipped seat of FIG. 9 with parts of the seat shell broken away to better show assembly of the back support adjustment assembly to the seat shell.

Between each trunnion seating channel 136 and any locator rib 148 provided is a drive arm housing compartment 150 that is also integrally formed in the shell 40. As is best shown in FIGS. 11 and 12, each drive arm housing compartment 150 is curved and extends nearly to the outer rear surface 152 of the shell 40 to permit rotation of the drive 46 a full 360° of travel by being large enough to accommodate the apex 154 of the longest extent of the drive arm 76 or drive arm cam 78. For example, where the drive 46 is equipped with cams 78, the compartment 150 is deep enough to provide clearance for the longest cam lobe 156 to rotate completely around and through the compartment 150 without any portion of the compartment 150 interfering.

FIGS. 14-16 illustrate another preferred embodiment having an adjuster drive 158 that includes manually driven actuators 86″ that preferably are integrally molded with the rest of the drive 158 such that drive arms 76, mandrel 80, trunnions 74 and actuators 86″ are molded as a single unit that is of one-piece, unitary, and substantially homogenous construction. As is best shown in FIG. 14, each actuator 86″ comprises a thumb wheel 160 that can be easily manually rotated to adjust lumbar support.

The embodiment shown in FIGS. 14-16 also differs from the embodiment shown in FIGS. 2-14 by including at least a plurality of upraised journal forks 162 that define an adjuster drive cradle 134′ different from the cradle 134 of FIGS. 2-14. Each journal fork 162 has a curved journal seat 164 recessed in its free end that has a curved contour suitably complementary to the curved exterior of a drive trunnion 74 or drive mandrel 80 of the drive 158 (whichever it is configured to seat). In the preferred embodiment shown in FIGS. 15 and 16, there are a pair of outer journal forks 162 that each receive and rotatively support one of the drive trunnions 74 and at least one journal fork 162 located between the outer forks 162 that receives and rotatively supports drive mandrel 80. While the drive arms 76′ of the adjuster drive 158 are shown in FIGS. 15 and 16 as each being of solid or substantially solid construction, they can be of hollow or tubular construction if desired. They also can include cams 78 like that of the adjuster drive 46 shown in FIGS. 2-4 and in FIGS. 9-13, if desired.

Referring once again to FIGS. 2-4 and 9-13, during operation, rotation of the adjuster drive 46 causes drive arm 76 to bear against adjuster shoe 48 urging the shoe 48 outwardly towards the seat cover 50. With specific reference to FIGS. 11 and 12, outward displacement of the shoe 48 displaces the seat cushion 53 it bears against accordingly, which in turn can outwardly displace the seat cover 50. As is best shown in FIG. 11, outward displacement of the shoe 48 during adjustment causes the shoe 48 to bear against a rear or interior surface 51 of the seat cover 50 or the cushion 53.

Displacement can be proportional or can depend on factors such as whether any cushion compression and/or seat cover deformation occurs during lumbar adjustment. Where it does not displace the seat cover 50 or does not do so proportionally, firming lumbar adjustment preferably causes the outwardly displacing shoe 48 to at least somewhat compress and/or oppose rearward displacement of the cushion (not shown) thereby providing firmer lumbar support to a seat occupant. Where the cushion is made of a resilient foam or the like, outward displacement of the shoe 48 against the cushion can compress the cushion to increase firmness in the lumbar region by making the cushion less compliant. In one preferred method of operation, rotation of the drive 46 in one direction moves the shoe 48 outwardly displacing the seat cover 50 outwardly.

Conversely, when the drive 46 is rotated so its drive arm(s) 76 rotate away from the shoe 48, lumbar firmness is reduced because the shoe 48 displaces the cushion and/or seat cover 50 less thereby also applying less lumbar adjustment force in the same region. As a result, where the degree of lumbar firmness depends on cushion compression to any degree, permitting the shoe 48 to displace rearwardly toward the shell 40 preferably increases cushion compliance by permitting the cushion to at least somewhat decompress by reducing or removing the force applied by the shoe 48. In one preferred method of operation, rotation of the drive 46 in an opposite direction causes the shoe 48 to move inwardly away from the seat cover 50 causing the seat cover 50 also to move inwardly.

Various alternatives are contemplated as being within the scope of the following claims particularly pointing out and distinctly claiming the subject matter regarded as the invention. For example, the seat shell 40 can be configured such that the features molded in its backrest section 126 to accommodate the adjustable back support assembly 44 are molded into its seat occupant supporting portion 124 thereby enabling the adjustable back support assembly 44 to be used as an adjustable bolster or to provide adjustable thigh or leg support. It is therefore also to be understood that, although the foregoing description and drawings describe and illustrate in detail one or more preferred embodiments of the present invention, to those skilled in the art to which the present invention relates the present disclosure will suggest many modifications and constructions as well as widely differing embodiments and applications without thereby departing from the spirit and scope of the invention.

What is claimed is:

1. A seat comprising an adjustable seat occupant support assembly in combination with a molded seat shell comprising:
    the seat shell comprising a shell body made of a moldable material having a cradle that includes a narrowed receptacle at each end formed in the shell body of the shell body;
    the adjustable seat occupant support assembly comprising a drive rotatable about an axis of rotation rotatively supported in the cradle that includes a rod at each end received in a corresponding one of the receptacles, and an effector in operable cooperation with the drive;
    an outer seat cover that overlies the drive and the effector and defines a seat occupant support surface upon which a seat occupant can be supported when sitting wherein at least one of the receptacles comprises a guide having an inclined bottom guide wall extending generally parallel to the axis of rotation of the drive; and
    wherein rotation of the drive causes the effector to cause the outer seat cover to displace or cause the shape of the outer seat cover to be modified.

2. The seat of claim 1 wherein each rod comprises a generally cylindrical trunnion, wherein each one of the receptacles comprises a journal, and wherein the guide comprises a trunnion-insertion guide channel generally transverse to the axis of rotation of the drive with the journal comprising an end wall of the guide channel.

3. The seat of claim 1 wherein the drive comprises at least one rotatable arm disposed between the rods that cooperates with the effector during rotation of the drive displacing part of the outer seat cover that provides support to a seat occupant.

4. The seat of claim 1 wherein the effector comprises a movable shoe in contact with the drive that is displaced by the drive toward the outer seat cover during rotation of the drive.

5. The seat of claim 4 wherein the movable shoe comprises a flexible plate or a sheet.

6. The seat of claim 1 wherein the effector comprises a plate or sheet having one portion fixed to the seat shell body and another portion overlying part of the drive.

7. The seat of claim 6 wherein the plate or sheet is flexible, underlies a portion of the outer seat cover that is disposed adjacent a lumbar region of the back of a seat occupant received in the seat, and bears against part of the drive for movement substantially in unison therewith.

8. The seat of claim 1 wherein the drive further comprises a cam having a plurality of rounded cam lobes with one of the plurality of cam lobes extending farther outwardly from the axis of rotation of the drive than another one of the plurality of cam lobes correspondingly urging the effector farther outwardly during rotation of the drive.

9. The seat of claim 1 wherein the shell body comprises a shell wall with an exterior surface in which an aperture is disposed and further comprising an actuator having a portion disposed adjacent the aperture that operatively cooperates with the drive controlling drive operation.

10. The seat of claim 9 wherein the aperture extends completely through the shell wall and the actuator comprises a manipulable knob that snaps onto a free end of one of the rods received in a respective receptacle attaching the knob to the rod such that movement of the knob rotates the drive.

11. The seat of claim 1 wherein the shell body comprises a pair of spaced apart shell walls with at least one of the shell walls having an aperture in communication with an adjacent receptacle and further comprising an actuator having a manipulable grip portion accessible exteriorly of the shell body and a coupling portion substantially coaxial with the rotational axis of the drive that extends into the aperture coaxially engaging the rod received in the adjacent receptacle.

12. The seat of claim 1 wherein the shell body comprises a through hole in communication with one of the receptacles and further comprising an actuator having an exteriorly disposed manipulable grip and a socket received in the hole telescopically engaging the rod received in the one of the receptacles.

13. A seat comprising an adjustable seat occupant support assembly in combination with a molded seat shell comprising:
- the seat shell comprising a shell body made of a moldable material having a cradle that includes a narrowed receptacle at each end;
- the adjustable seat occupant support assembly comprising a drive rotatable about an axis of rotation rotatively supported in the cradle that includes a rod at each end received in a corresponding one of the receptacles, and an effector in operable cooperation with the drive;
- an outer seat cover that overlies the drive and the effector and defines a seat occupant support surface upon which a seat occupant can be supported when sitting; and
- wherein rotation of the drive causes the effector to cause the outer seat cover to displace or cause the shape of the outer seat cover to be modified; and
- wherein the drive further comprises a cam having a plurality of rounded cam lobes with one of the plurality of cam lobes extending farther outwardly from the axis of rotation of the drive than another one of the plurality of cam lobes correspondingly urging the effector farther outwardly during rotation of the drive;
- wherein the cam lobes are discrete and spaced apart.

14. A seat comprising an adjustable seat occupant support assembly in combination with a molded seat shell comprising:
- the seat shell comprising a shell body made of a moldable material having a cradle that includes a narrowed receptacle at each end;
- the adjustable seat occupant support assembly comprising a drive rotatable about an axis of rotation rotatively supported in the cradle that includes a rod at each end received in a corresponding one of the receptacles, and an effector in operable cooperation with the drive;
- an outer seat cover that overlies the drive and the effector and defines a seat occupant support surface upon which a seat occupant can be supported when sitting; and
- wherein rotation of the drive causes the effector to cause the outer seat cover to displace or cause the shape of the outer seat cover to be modified; and
- wherein the cradle comprises a locator formed in an interior surface of the shell body from the shell body that registers with part of the drive axially locating the drive in the cradle while permitting relative rotation therebetween.

15. The seat of claim 14 wherein the locator comprises an upraised rib in the cradle.

16. A molded seat shell in combination with an adjustable seat occupant support arrangement wherein:
- the seat shell comprises a shell body made of a moldable material having an elongate transversely extending cradle comprising a three dimensionally contoured recess in the shell body formed of the shell body and a pair of oppositely extending spaced apart receptacles formed of the shell body with at least one of the receptacles comprising a rod insertion guide channel generally transverse to a longitudinal extent of the cradle that is open at one end and that defines at least part of the receptacle at the other end; and
- the adjustable seat occupant support arrangement comprises a drive received in the cradle of the shell body, the drive comprising a pair of oppositely outwardly extending rods each received in a corresponding one of the receptacles.

17. The molded seat shell and adjustable seat occupant support arrangement of claim 16 further comprising an effector overlying the drive displaceable by the drive and further comprising a seat occupant supporting surface overlying the effector displaceable by the effector.

18. The molded seat shell and adjustable seat occupant support arrangement of claim 17 wherein the drive comprises a rotatable armature rotatable about an axis of rotation when the drive is received in the cradle with the armature bearing against the effector displacing the effector during drive rotation and wherein the seat occupant supporting surface comprises a seat cover overlying the effector and drive armature.

19. The molded seat shell and adjustable seat occupant support arrangement of claim 17 wherein the effector comprises a plate or sheet that overlies the armature and has a portion fixed to the shell body.

20. The molded seat shell and in combination with an adjustable seat occupant support arrangement assembly of claim 16 wherein each rod comprises a generally cylindrical rotary trunnion and each receptacle comprises a trunnion journal formed of the shell body rotatively supporting a corresponding trunnion.

21. The molded seat shell and adjustable seat occupant support arrangement of claim 16 wherein, wherein the drive comprises a drive body and each rod comprises a generally cylindrical trunnion, wherein one of the drive body and at least one trunnion rotates about an axis of rotation, and wherein the at least one rod insertion guide channel has an insertion guide wall generally transverse to the axis of rotation guiding and axially locating an end of a corresponding trunnion inserted into the receptacle during insertion of the drive into the cradle.

22. The molded seat shell and in combination with an adjustable seat occupant support arrangement assembly of claim 21 wherein the seat shell body has a pair of spaced apart sidewalls with each receptacle integrally formed in a corresponding one of the shell body sidewalls and each receptacle defining a trunnion-insertion guide channel having a channel end comprising a trunnion journal.

23. The molded seat shell and adjustable seat occupant support arrangement of claim 16 further comprising an actuator carried by the seat shell body that is operably connected to the drive.

24. The molded seat shell and in combination with an adjustable seat occupant support arrangement assembly of claim 16 wherein the shell body has an aperture in communication with an adjacent one of the receptacles and further comprising a knob generally coaxially engaging a free end of the rod received in the adjacent one of the receptacles rotating the rod in unison therewith.

25. The molded seat shell and adjustable seat occupant support arrangement of claim 24 wherein the knob has an outwardly extending stem disposed in the aperture that couples with the rod received in the adjacent one of the receptacles enabling rotation of the drive substantially in unison with rotation of the knob.

26. The molded seat shell and adjustable seat occupant support arrangement of claim 16 further comprising an effector comprising a plate or sheet overlying part of the drive, wherein the drive is rotatable in the cradle about an axis of rotation and comprises a cam having a plurality of rounded lobes with one of the lobes spaced outwardly a greater distance relative to the axis of rotation of the drive than another one of the lobes, and wherein rotation of the drive causes respective contact between each one of the plurality of cam lobes and the plate or sheet to displace the plate or sheet relative to the seat shell body.

27. The molded seat shell and adjustable seat occupant support arrangement of claim 16 wherein the shell body and drive are molded of plastic.

28. A molded seat shell in combination with an adjustable seat occupant support assembly wherein:
   the seat shell comprises a seat shell body made of a moldable material having an elongate cradle that is three dimensionally formed in and of the seat shell body having a pair of narrowed channels each comprising a trunnion-receptacle having an open end that facilitates insertion of a trunnion of an adjustable seat occupant support assembly and at least one aperture extending through the seat shell body that communicates with one of the trunnion receptacles; and
   the adjustable seat occupant support assembly comprises:
   (a) a drive received in the cradle and having a pair of spaced apart trunnions each received in a corresponding trunnion receptacle of the cradle allowing rotation of the drive in the cradle relative to the seat shell body;
   (b) a manipulable actuator disposed in the aperture that operably connects to the drive and that is manipulable to rotate the drive.

29. The molded seat shell and adjustable seat occupant support assembly of claim 28 further comprising a locator arrangement locating the drive in the cradle.

30. The molded seat shell and adjustable seat occupant support assembly of claim 29 wherein the locator arrangement comprises a locator that is received in a locator recess.

31. The molded seat shell and adjustable seat occupant support assembly of claim 30 wherein locator comprises an upraised portion of the cradle.

32. The molded seat shell and adjustable seat occupant support assembly of claim 31 wherein the drive comprises a drive body from which the trunnions oppositely outwardly extend, wherein the locator comprises a rib, and wherein the locator recess is formed in the drive body.

33. The molded seat shell and adjustable seat occupant support assembly of claim 28 further comprising a seat cover overlying the drive and a flat plate or sheet disposed between the drive and seat cover and fixed to the shell body that flexes when displaced by the drive displacing the seat cover.

34. The molded seat shell and adjustable seat occupant support assembly of claim 28 wherein the manipulable actuator comprises a knob having a socket received in a hole in the shell body coaxially snapping onto a free end of one of the trunnions rotating the drive in unison therewith.

35. A molded seat shell in combination with an adjustable seat occupant support assembly wherein:
   the seat shell comprises a seat shell body made of a moldable material having an elongate and transversely extending cradle three dimensionally formed in and of the seat shell body having a pair of spaced apart trunnion-receiving channels and an upraised locator formed of the seat shell body disposed between the trunnion-receiving channels receiving, axially locating and allowing relative rotation between the seat shell body and part of an adjustable seat occupant support assembly; and
   the adjustable seat occupant support assembly comprises:
   (a) an elongate transversely oriented drive received in the cradle having a locator recess in registry with the upraised locator when the drive is received in the cradle axially locating the drive in the cradle, the drive rotatable about a longitudinally extending axis of rotation when the drive is received in the cradle, and the drive having a pair of oppositely extending trunnions with each trunnion received and rotatively supported in a corresponding one of the trunnion-receiving channels of the cradle; and
   (b) an actuator that operatively cooperates with the drive to selectively cause rotation of the drive.

36. The molded seat shell and adjustable seat occupant support assembly of claim 35 wherein the drive comprises a drive body from which the trunnions oppositely outwardly extend, wherein the locator comprises a rib disposed in the cradle, and wherein the locator recess comprises a recess in the drive body.

37. The molded seat shell and adjustable seat occupant support assembly of claim 36 wherein the drive body comprises a plurality of drive arms spaced apart defining the locator recess therebetween.

38. The molded seat shell and adjustable seat occupant support assembly of claim 35 wherein the actuator comprises a manipulable knob having a portion received in a hole in the shell body coaxially engaging one of the trunnions for rotation in unison therewith.

39. A seat comprising an adjustable seat occupant support arrangement in combination with a molded seat shell comprising:
   the seat shell comprising a shell body made of a moldable material with a cradle formed in it that includes a receptacle at each end;
   the adjustable seat occupant support arrangement comprising a drive rotatively supported in the cradle that includes a rod at each end received in a corresponding one of the receptacles;
   an outer seat cover that overlies the drive and part of the shell body that defines a seat occupant support surface upon which a seat occupant is supported when sitting;
   wherein the cradle and drive are three dimensionally contoured providing a locator arrangement locating the drive in the cradle permitting relative rotation therebetween;
   wherein the locator arrangement comprises a locator disposed in the cradle that extends outwardly and a locator recess disposed in the drive that receives the locator; and
   wherein rotation of the drive displaces or modifies the shape of the seat cover.

40. The seat of claim 39 wherein the locator comprises an upraised rib formed of the shell body extending outwardly from the cradle between the receptacles and wherein the drive comprises an armature with the locator recess formed in the armature between the rods.

* * * * *